(12) United States Patent
Lawler et al.

(10) Patent No.: US 8,811,812 B1
(45) Date of Patent: Aug. 19, 2014

(54) CAMERA RIG

(71) Applicants: Michael Shawn Lawler, North Hollywood, CA (US); David Charles Smith, North Hollywood, CA (US)

(72) Inventors: Michael Shawn Lawler, North Hollywood, CA (US); David Charles Smith, North Hollywood, CA (US)

( * ) Notice: Subject to any disclaimer, the term of this patent is extended or adjusted under 35 U.S.C. 154(b) by 0 days.

(21) Appl. No.: 14/227,309

(22) Filed: Mar. 27, 2014

(51) Int. Cl.
*G03B 17/56* (2006.01)
*G03B 29/00* (2006.01)
*B60R 9/00* (2006.01)
*F16B 47/00* (2006.01)

(52) U.S. Cl.
CPC .................................. *G03B 17/561* (2013.01)
USPC ........ 396/332; 396/419; 396/429; 248/206.3; 224/482; 348/36; 348/148; 348/159

(58) Field of Classification Search
CPC ....... G03B 17/561; G03B 29/00; G03B 41/00
USPC ............ 396/322, 332, 419, 427; 348/36, 148, 348/159; 248/206.3; 224/482
See application file for complete search history.

(56) References Cited

U.S. PATENT DOCUMENTS

| | | | | |
|---|---|---|---|---|
| 4,669,843 A * | 6/1987 | Bozzolato | ........................ | 396/12 |
| 4,863,130 A * | 9/1989 | Marks, Jr. | ................... | 248/206.3 |
| 5,246,193 A * | 9/1993 | Faidley | ....................... | 248/206.3 |
| 6,535,242 B1 * | 3/2003 | Strumolo et al. | .............. | 348/148 |
| 6,950,120 B1 | 9/2005 | Endo | | |
| 7,298,969 B2 * | 11/2007 | Elberbaum | ....................... | 396/28 |
| 7,527,440 B1 * | 5/2009 | White | ............................ | 396/419 |
| 7,654,425 B2 * | 2/2010 | Huang et al. | ................... | 224/483 |
| 2009/0201361 A1 | 8/2009 | Lyon | | |
| 2010/0220173 A1 | 9/2010 | Anguelov | | |

* cited by examiner

*Primary Examiner* — WB Perkey
(74) *Attorney, Agent, or Firm* — Plager Schack, LLP

(57) ABSTRACT

A camera rig system is configured to film in several overlapping directions at once. The camera rig system has a front rig having a first plurality of cameras arranged to film in a first set of overlapping directions. A trigger box is electrically coupled to the front rig and configured to receive data from the first plurality of cameras. A rear rig having a second plurality of cameras is electrically coupled to the trigger box and arranged to film in a second set of overlapping directions. The first set of overlapping directions and the second set of overlapping directions are configured such that images taken from the first plurality of cameras and the second plurality of cameras can reflect background images around the camera rig system.

6 Claims, 4 Drawing Sheets

CAMERA RIG

BACKGROUND

The embodiments herein relate generally to systems that simultaneously obtain video footage in different directions.

Prior to embodiments of the disclosed invention, in movies and television, many scenes where characters are driving in a car are done with actors on a stage in the car with a green screen behind them. The background driving footage is added in later at a post house. In the past, shooting the background footage has been cumbersome and difficult as a single camera mounted to a vehicle would have to make multiple passes on a street at different angles to get the footage needed. The prior art includes: U.S. Patent Application Publication 2009/0201361 published by Lyon; U.S. Pat. No. 6,950,120 issued to Endo; and U.S. Patent Application Publication 2010/0220173 issued to Anguelov.

Lyon utilizes cameras arranged in a "rosette formation" instead of a "nodal formation" and attempts to reduce errors by staggering the timing of cameras to reduce parallax rather than obtaining images at substantially overlapping angles. Endo teaches cameras arranged in a traditional two image overlap formation rather than a nodal formation. Like Lyon, Endo is interested primarily in a timing algorithm. Anguelov is directed toward a stitching algorithm and is uninterested with the orientation of cameras.

SUMMARY

A camera rig system is configured to film in several overlapping directions at once. The camera rig system has a front rig having a first plurality of cameras arranged to film in a first set of overlapping directions. A trigger box is electrically coupled to the front rig and configured to receive data from the first plurality of cameras. A rear rig having a second plurality of cameras is electrically coupled to the trigger box and arranged to film in a second set of overlapping directions. The first set of overlapping directions and the second set of overlapping directions are configured such that images taken from the first plurality of cameras and the second plurality of cameras can reflect background images around the camera rig system.

In some embodiments, the front rig further can comprise a front relay box electrically coupled to a first front camera, a second front camera and a third front camera. The rear rig can further comprise a rear relay box electrically coupled to a first rear camera, a second rear camera, a third rear camera, a fourth rear camera and a fifth rear camera. The rear relay box can be further electrically coupled to a middle camera.

In some embodiments, the front rig can further comprise a front rig plate mechanically coupled to a first front suction cup, a second front suction cup and a third front suction cup. A first front lower rod can be mechanically coupled to the first front suction cup. A first front knuckle can be adjustably connected to the first front lower rod. A first front upper rod can be adjustably connected to the first front knuckle. The first front upper rod can be mechanically coupled to the front rig plate.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
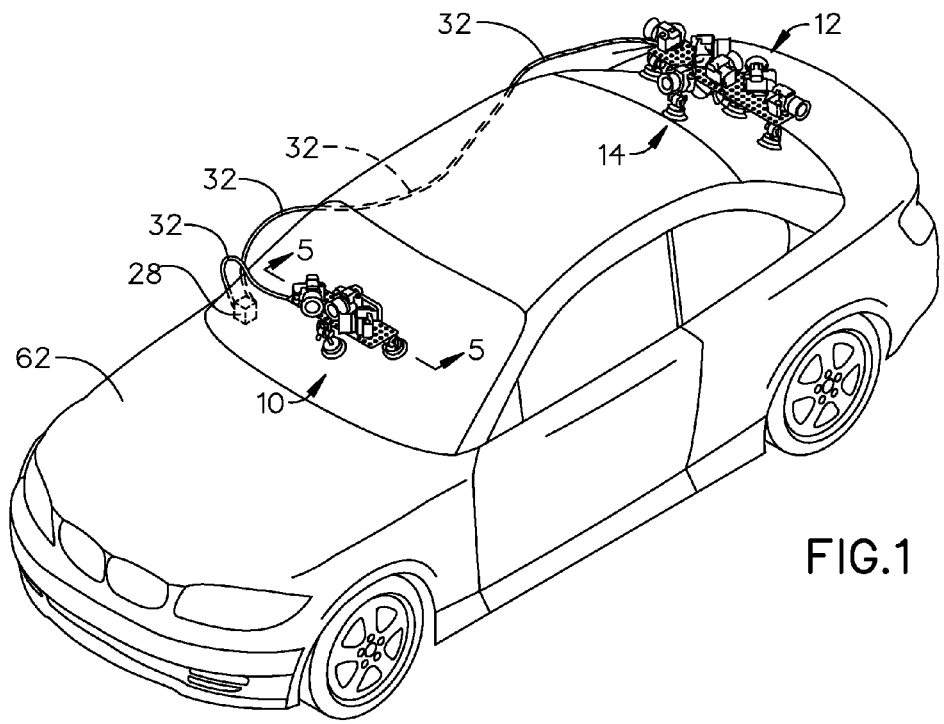
FIG. 1 is a perspective view of an embodiment of the invention, shown in use.

By way of example, and referring to FIG. 1, one embodiment of the camera rig comprises front rig 10 communicatively coupled to trigger box 28 with front trigger box cable 32. Trigger box 28 is further communicatively coupled to rear rig 12 and middle rig 14 with rear trigger box cable 32. Trigger box 28 is configured to receive data from front rig 10, rear rig 12 and middle rig 14.

Figure 2:
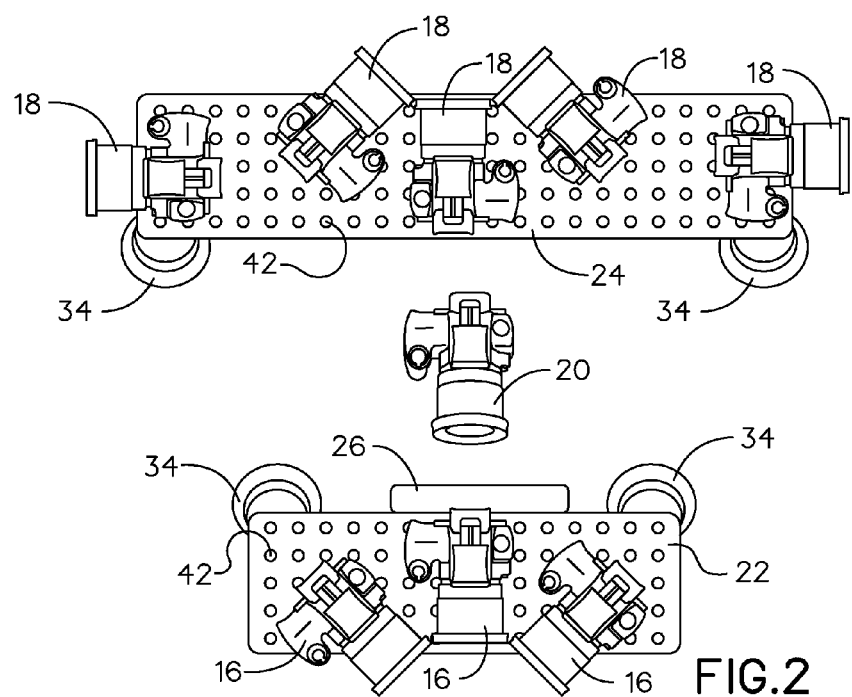
FIG. 2 is a top view of an embodiment of the invention.

FIG. 2 shows the nodal arrangement of cameras. In this embodiment, three nodes are used, a front node, a middle note and a rear node. The front node comprises front rig plate 22 mechanically coupled to first front camera 16, second front camera 16 and third front camera 16. Note that the lenses on the three front cameras 16 are immediately adjacent to one another creating the nodal arrangement which is distinct from Lyons. Front rig plate 22 further comprises threaded holes 42 which are configured to accommodate front cameras 16 as shown in more detail in FIG. 3. Front rig plate 22 is connected to car 62 with suction cups 34.

The middle node comprises middle camera 20. The rear node comprises rear rig plate 24 mechanically coupled to first rear camera 18, second rear camera 18, third rear camera 18, fourth rear camera 18 and fifth rear camera 18. Note that the lenses on three of the rear cameras 16 are immediately adjacent to one another creating the nodal arrangement which is distinct from Lyons. Rear rig plate 24 further comprises threaded holes 42 which are configured to accommodate rear cameras 18 as shown in more detail in FIG. 3. Rear rig plate 24 is connected to car 62 with suction cups 34.

Figure 3:
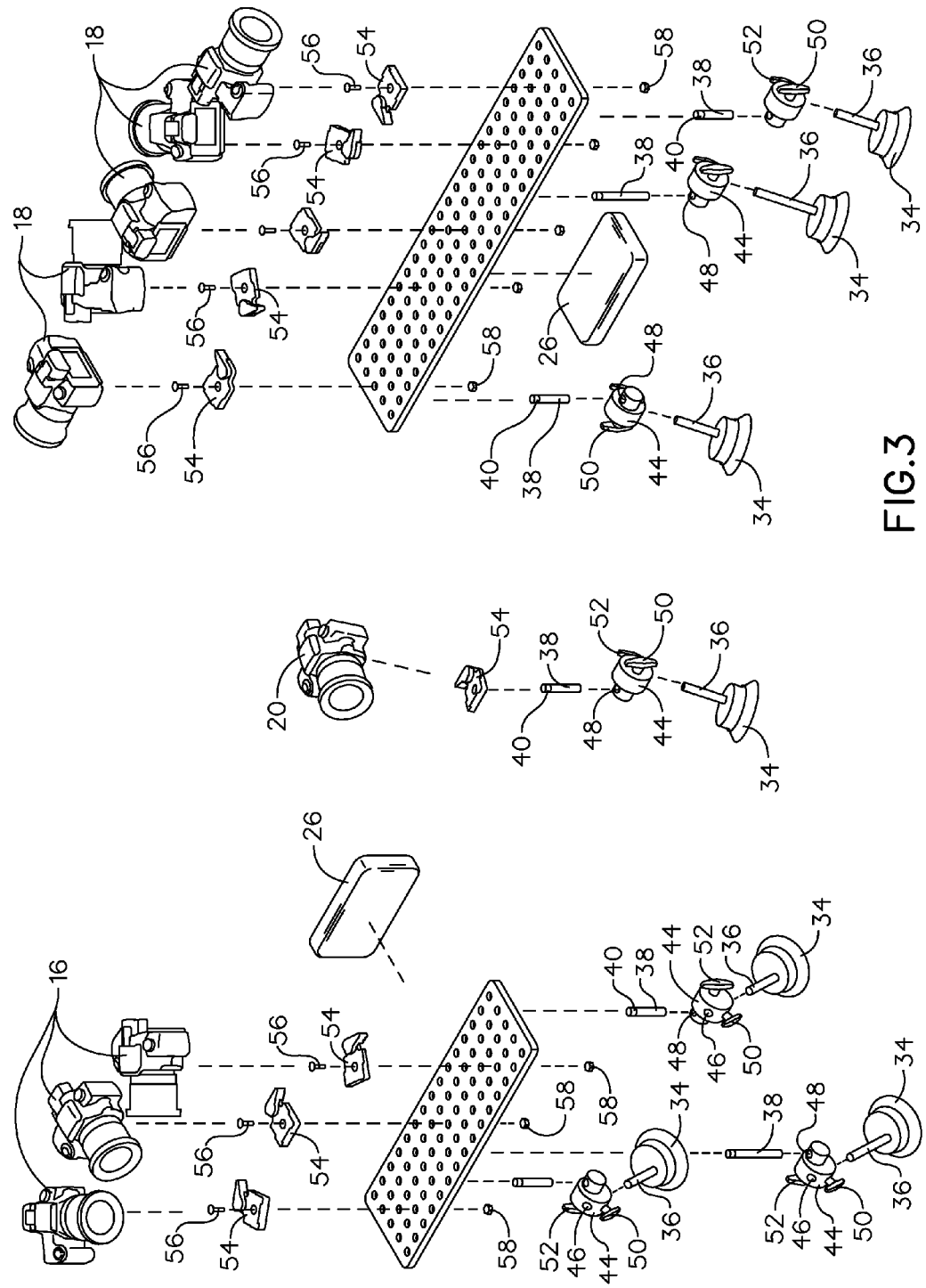
FIG. 3 is an exploded view of an embodiment of the invention.

FIG. 3 shows this arrangement in more detail. First front camera 16 is mechanically coupled to first front camera mounting plate 54 with first front camera bolt 56 through threaded hole 42 and first front camera nut 58. Likewise, second front camera 16 is mechanically coupled to second front camera mounting plate 54 with second front camera bolt 56 through threaded hole 42 and second front camera nut 58. Similarly, third front camera 16 is mechanically coupled to third front camera mounting plate 54 with third front camera bolt 56 through threaded hole 42 and third front camera nut 58.

First front suction cup 34 is mechanically coupled to first front lower rod 36. First front lower rod 36 is threaded through first front lower rod hole 46 on first front knuckle 44, which is then connected with first front lower rod set screw 50. First front knuckle 44 is further connected to first front upper rod 38 with first front upper rod set screw 52. First front upper rod 38 further comprises first front upper rod threaded section 40 which is configured to be threaded into threaded hole 42.

Likewise, second front suction cup 34 is mechanically coupled to second front lower rod 36. Second front lower rod 36 is threaded through second front lower rod hole 46 on second front knuckle 44, which is then connected with second front lower rod set screw 50. Second front knuckle 44 is further connected to second front upper rod 38 with second front upper rod set screw 52. Second front upper rod 38 further comprises second front upper rod threaded section 40 which is configured to be threaded into threaded hole 42.

Similarly, third front suction cup 34 is mechanically coupled to third front lower rod 36. Third front lower rod 36 is threaded through third front lower rod hole 46 on third front knuckle 44, which is then connected with third front lower rod set screw 50. Third front knuckle 44 is further connected to third front upper rod 38 with third front upper rod set screw 52. Third front upper rod 38 further comprises third front upper rod threaded section 40 which is configured to be threaded into threaded hole 42.

Turning to middle rig 14, middle rod 36 is threaded through middle lower rod hole 46 on middle knuckle 44, which is then connected with middle lower rod set screw 50. Middle knuckle 44 is further connected to middle upper rod 38 with middle upper rod set screw 52. Middle upper rod 38 further comprises middle upper rod threaded section 40 which is configured to be threaded into third middle camera mounting plate 54 and into middle camera 20.

Turning to rear rig 12, first rear camera 18 is mechanically coupled to first rear camera mounting plate 54 with first rear camera bolt 56 through threaded hole 42 and first rear camera nut 58. Likewise, second rear camera 18 is mechanically coupled to second rear camera mounting plate 54 with second rear camera bolt 56 through threaded hole 42 and second rear camera nut 58. Similarly, third rear camera 18 is mechanically coupled to third rear camera mounting plate 54 with third rear camera bolt 56 through threaded hole 42 and third rear camera nut 58.

First rear suction cup 34 is mechanically coupled to first rear lower rod 36. First rear lower rod 36 is threaded through first rear lower rod hole 46 on first rear knuckle 44, which is then connected with first rear lower rod set screw 50. First rear knuckle 44 is further connected to first rear upper rod 38 with first rear upper rod set screw 52. First rear upper rod 38 further comprises first rear upper rod threaded section 40 which is configured to be threaded into threaded hole 42.

Likewise, second rear suction cup 34 is mechanically coupled to second rear lower rod 36. Second rear lower rod 36 is threaded through second rear lower rod hole 46 on second rear knuckle 44, which is then connected with second rear lower rod set screw 50. Second rear knuckle 44 is further connected to second rear upper rod 38 with second rear upper rod set screw 52. Second rear upper rod 38 further comprises second rear upper rod threaded section 40 which is configured to be threaded into threaded hole 42.

Similarly, third rear suction cup 34 is mechanically coupled to third rear lower rod 36. Third rear lower rod 36 is threaded through third rear lower rod hole 46 on third rear knuckle 44, which is then connected with third rear lower rod set screw 50. Third rear knuckle 44 is further connected to third rear upper rod 38 with third rear upper rod set screw 52. Third rear upper rod 38 further comprises third rear upper rod threaded section 40 which is configured to be threaded into threaded hole 42.

Figure 4:
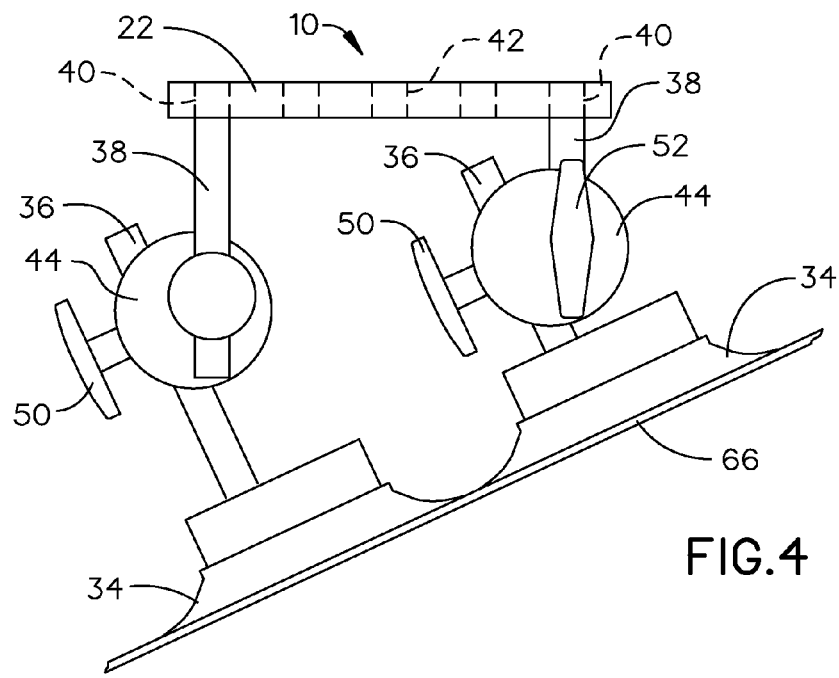
FIG. 4 is a side view of an embodiment of the invention.
Figure 5:
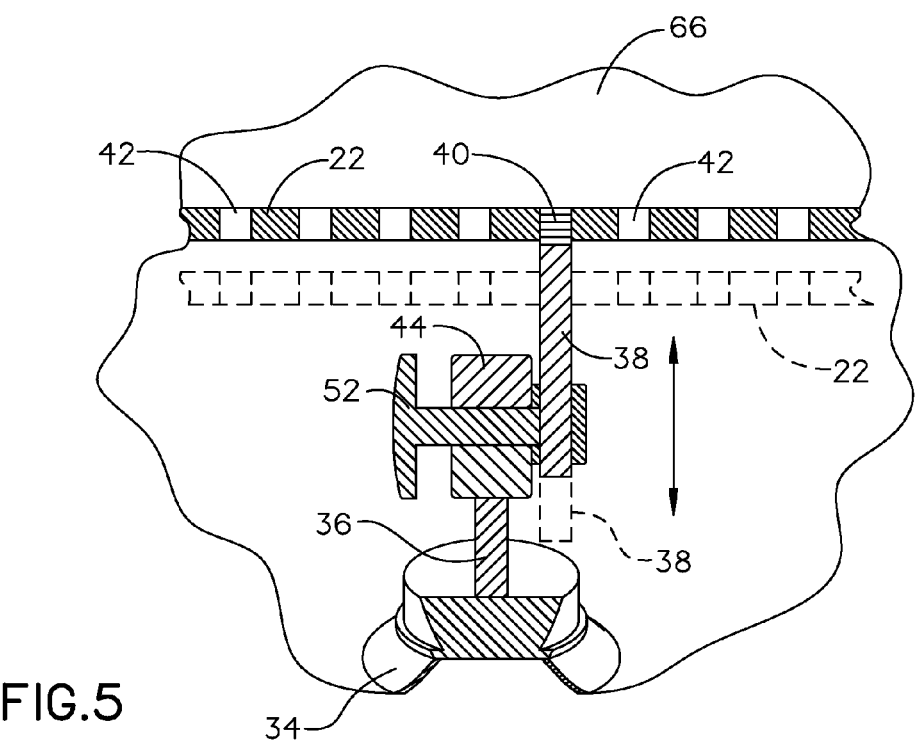
FIG. 5 is a section view of an embodiment of the invention, taken along line 5-5 in FIG. 1.

FIG. 4 and FIG. 5 provide a solution unique to the nodal arrangement not found in Lyons or the rest of the prior art. Namely, how to film footage that appears to be flat on a windshield 66 on car 62 that is not flat. This is important because being able to film from realistic angles makes footage appear more realistic. For instance in front rig 10, first front lower rod set screw 50 can be loosened and then first front rod 36 can be raised and lowered as desired. Likewise, first front upper rod set screw 52 can be loosened and then first front upper rod 38 can be raised and lowered as desired.

Figure 6:
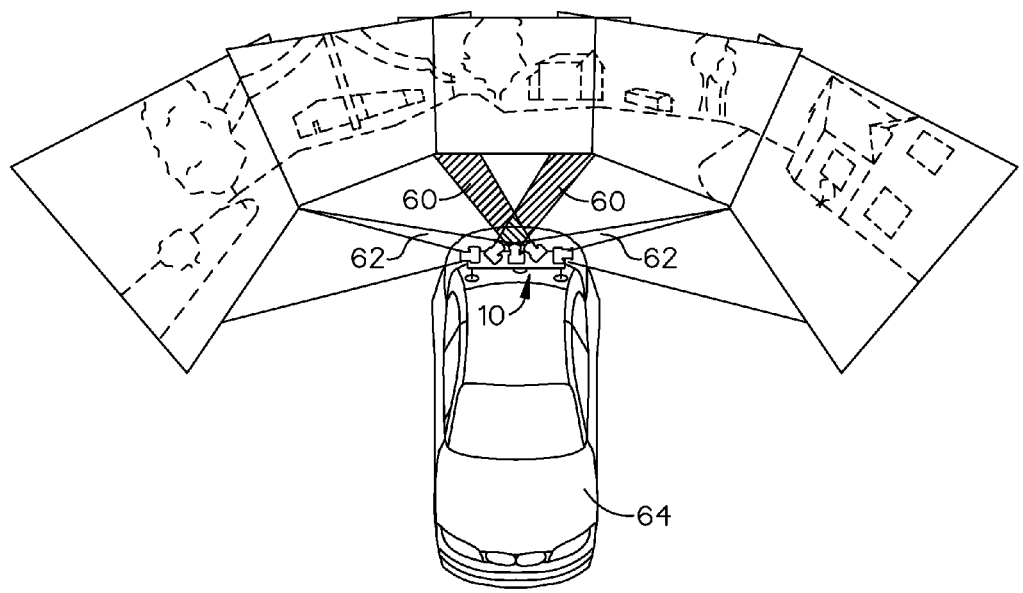
FIG. 6 is a schematic view of an embodiment of the invention.

Turning to FIG. 6, there are a potentially unlimited number of possible orientations for the cameras at any particular node. However, the following are significant. First, the presence of gaps 62 between the side rear cameras 18 and the nodal rear cameras 18 should be constrained such that the gaps do not cover area that is necessary for the green screen. Second, overlap areas 60 are fine and since the nodal cameras are next to one another, this is expected. Editing software can use the overlap to coordinate the images.

In this regard, front rig 10 has a first plurality of cameras 16 arranged to film in a first set of overlapping directions. Likewise, rear rig 12 has a second plurality of cameras 18 arranged to film in a second set of overlapping directions.

Figure 7:
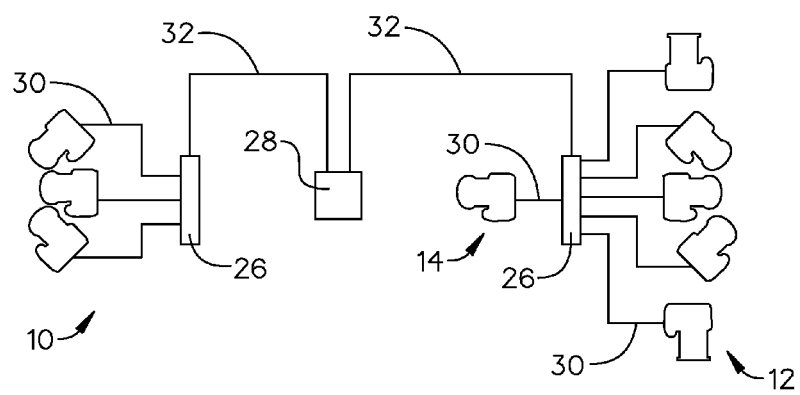
FIG. 7 is a schematic view of an embodiment of the invention.

FIG. 7 shows a theory of electrical wiring of the camera rig. Front rig 10 comprises front relay box 26 which is electrically coupled to first front camera 16, second front camera 16 and third front camera 16 is relay box cables 30. Front relay box 26 is electrically coupled to trigger box 28 with trigger box cable 32. Similarly, middle rig 14 comprises middle camera 20 that is electrically coupled to rear relay box 26 with relay box cable 30. Likewise, first rear camera 18, second rear camera 18, third rear camera 18, fourth rear camera 18 and fifth rear camera 18 are each electrically coupled to rear relay box 26 with relay box cable 30. Rear relay box 26 is electrically coupled to trigger box 28 with trigger box cable 32.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A camera rig system, configured to film in several overlapping directions at once;
   the camera rig system comprising:
   a front rig having a first plurality of cameras arranged to film in a first set of overlapping directions;
   a trigger box electrically coupled to the front rig and configured to receive data from the first plurality of cameras;
   a rear rig having a second plurality of cameras electrically coupled to the trigger box and arranged to film in a second set of overlapping directions;
   wherein the first set of overlapping directions and the second set of overlapping directions are configured such that images taken from the first plurality of cameras and the second plurality of cameras can reflect background images around the camera rig system.

2. The camera rig system of claim 1, wherein the front rig further comprises a front relay box electrically coupled to a first front camera, a second front camera and a third front camera.

3. The camera rig system of claim 2, wherein the rear rig further comprises a rear relay box electrically coupled to a first rear camera, a second rear camera, a third rear camera, a fourth rear camera and a fifth rear camera.

4. The camera rig system of claim 3, wherein the rear relay box is further electrically coupled to a middle camera.

5. The camera rig system of claim 1, wherein the front rig further comprises a front rig plate mechanically coupled to a first front suction cup, a second front suction cup and a third front suction cup.

6. The camera rig system of claim 5, further comprising a first front lower rod mechanically coupled to the first front suction cup;
a first front knuckle adjustably connected to the first front lower rod;
a first front upper rod adjustably connected to the first front knuckle;
wherein the first front upper rod is mechanically coupled to the front rig plate.

\* \* \* \* \*